Dec. 27, 1949     W. H. HUENERGARDT     2,492,865
AUTOMATIC HEAT CONTROL APPARATUS
Filed July 13, 1945     4 Sheets-Sheet 1

INVENTOR:
WILLIAM H. HUENERGARDT.
BY Harry C. [signature]
ATTORNEY.

Dec. 27, 1949  W. H. HUENERGARDT  2,492,865
AUTOMATIC HEAT CONTROL APPARATUS
Filed July 13, 1945  4 Sheets-Sheet 2

INVENTOR:
WILLIAM H. HUENERGARDT.
BY Harry C. Lerite
ATTORNEY.

Dec. 27, 1949 W. H. HUENERGARDT 2,492,865
AUTOMATIC HEAT CONTROL APPARATUS
Filed July 13, 1945 4 Sheets-Sheet 3

INVENTOR:
WILLIAM H. HUENERGARDT.
BY Harry C. Seeute
ATTORNEY.

Dec. 27, 1949 W. H. HUENERGARDT 2,492,865
AUTOMATIC HEAT CONTROL APPARATUS
Filed July 13, 1945 4 Sheets-Sheet 4

INVENTOR:
WILLIAM H. HUENERGARDT
BY Harry C. Aberts
ATTORNEY.

Patented Dec. 27, 1949

2,492,865

UNITED STATES PATENT OFFICE 2,492,865

AUTOMATIC HEAT CONTROL APPARATUS

William H. Huenergardt, Chicago, Ill.; Clarence H. Huenergardt, administrator of said William H. Huenergardt, deceased, assignor, by direct and mesne assignments, to Lydia Huenergardt, Chicago, Ill.

Application July 13, 1945, Serial No. 604,745

21 Claims. (Cl. 219—43)

This invention relates to heat timing devices and more particularly to automatic heat control operating instrumentalities, although the teachings thereof may be employed with equal advantage for other purposes.

This application is a continuation-in-part of my copending application Serial Number 566,558 which was filed December 4, 1944, and which eventuated into Letters Patent No. 2,402,163 on June 18, 1946. It contemplates more especially the provision of improved operating and switching instrumentalities for controlling the application or generation of heat from a predetermined initial fluid actuating period resulting from processing into edibles or other compositions within the dictates of commercial practice.

A fundamental application of the teachings of the invention is shown in connection with the well known infusion method of making coffee. With such a coffee maker, the product is completed and ready for serving within a matter of a few minutes after the water either boils or is near boiling. With the commencement of boiling or near boiling when the vapor pressure within the water exceeds atmospheric pressure, there is a resultant vibration serving as the impulse medium for the period of timing or continued application of heat. This vibration is translated to a sensitive timing instrumentality that is responsive thereto for operating switching or other control means in circuit with the heat generator. This illustrates the fundamentals of controlling the application of heat in accordance with the teachings of the present invention.

One object of the present invention is to simplify the construction and improve the operation of devices of the character mentioned.

Another object is to provide improved heat timing instrumentalities for automatically controlling the application of heat in the processing of substances therewith.

Still another object is to provide substance vapor pressure responsive means to time the extent of or effect the termination of boiling or any other suitable processing phenomena as the occasion may require or commercial practice may dictate.

A further object is to provide improved switching instrumentalities in conjunction with timing devices that may be preset to any particular processing requirements.

A still further object is to provide an improved vibration responsive device for timing the continued application of heat to the substance being heat processed therewith through the operation of improved switching instrumentalities.

Still a further object is to provide improved automatic switching and timing instrumentalities for processing coffee and like products utilizing a fluid as a constituent thereof.

Other objects and advantages will appear from the following description of an illustrative embodiment of the present invention.

The structure selected for illustration is not intended to serve as a limitation upon the scope or teachings of the invention, but is merely illustrative thereof. There may be considerable variations and adaptations of all or part of the teachings depending upon the dictates of commercial practice. The present embodiment comprises a circular base 10 comprising the bottom of a convexly curved casing 11 that is cast, spun or otherwise shaped to provide an upper circular opening 12 defined by a peripheral upstanding flange 13 through which the instrumentalities are placed within the casing 11. Depending posts 14 extend from the casing bottom 10 to effect the support thereof in spaced air cooling relation with a supporting surface.

Figure 10:
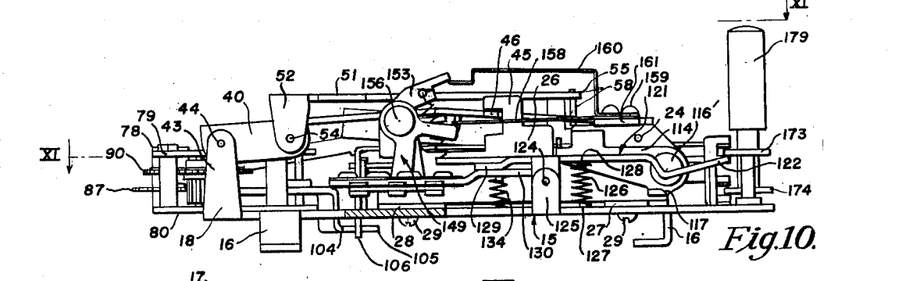
Figure 10 is a sectional view in elevation of the presetting mechanism taken substantially along line X—X of Figure 4.

The operating instrumentalities comprise an assembled unit in which a substantially rectangular supporting plate 15 is provided with mounting legs 16, in this instance three, that are stamped therefrom to depend to the casing base 10 for attachment thereto by external fasteners 17 to support the plate 15 in air cooling relation to the casing base 10. The plate 15 has upstanding straps 18, in this instance three, stamped therefrom to pivotally support confronting arms 19—20 comprising part of a cradle 21 which translates to the timing mechanism the vibrations of the heat generator and coffee maker operatively connected therewith. To this end, the cradle arm 19 is a substantially flat rectangular plate in the horizontal plane having a depending side flange 22 and an ear 23 extending therefrom to pivotally engage a pin 24 (Figures 4 and 17), the former connected to an upstanding ear 25 struck from the supporting plate 15 and the latter carried by a vertical bracket plate 26 comprising a part of a switch control mechanism support that has depending offset ears 27—28 enabling the attachment thereof to the supporting plate 15 by means of fasteners 29 (Figure 10).

Figures 14, 15, 16, 17, 18, 19, 20, 21:
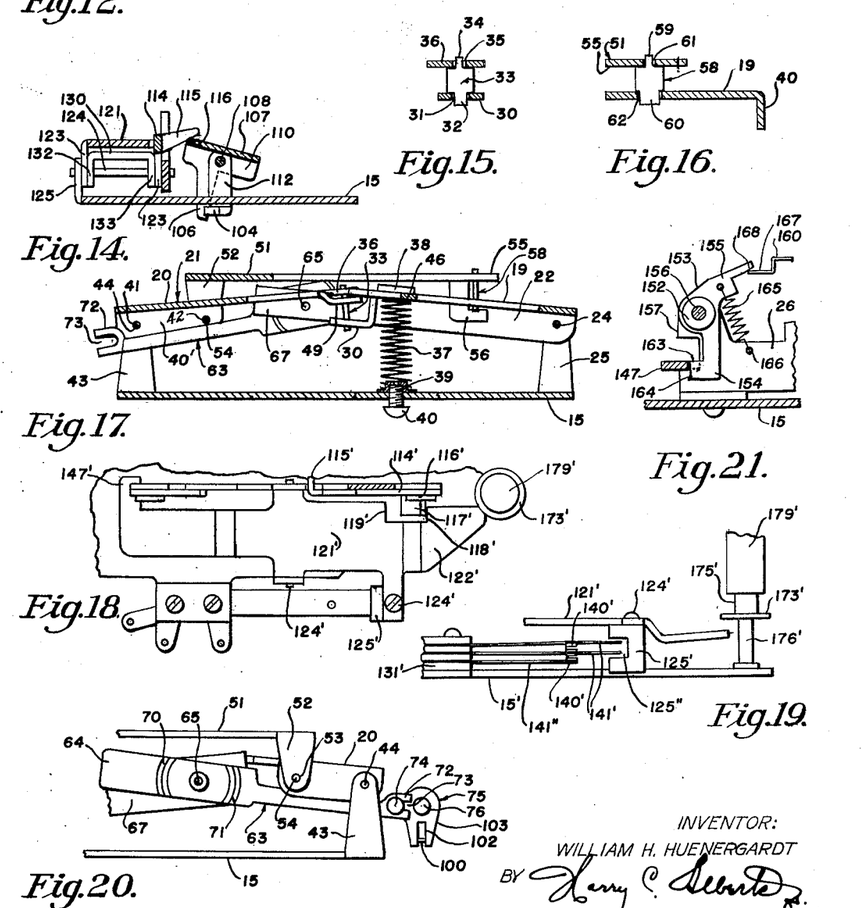
Figure 14 is a fragmentary sectional view taken substantially along line XIV—XIV of Figure 11.
Figure 15 is a fragmentary sectional view of a cradle fulcrum taken substantially along line XV—XV of Figure 4.
Figure 16 is a fragmentary sectional view of another cradle fulcrum taken substantially along line XVI—XVI of Figure 4.
Figure 17 is a fragmentary sectional view in elevation taken substantially along line XVII—XVII of Figure 4.
Figure 18 is a modified fragmentary plan view of an alternating current switching element viewed similarly to the combination A. C.-D. C. switching element shown in Figure 4.
Figure 19 is a side view in elevation of the A. C. switching element shown in its opposite position of displacement, the casing not being shown in this view.
Figure 20 is a fragmentary side view in elevation of self-presetting timing mechanism actuator.
Figure 21 is a sectional view taken substantially along line XXI-XXI of Figure 4.

The cradle arm 19 has its flat surface in the horizontal plane and presents a depending and horizontally offset finger 30 (Figure 17) having a slot 31 therein to register with the reduced extremity 32 of a fulcrum plate 33 (Figure 15) that has a reduced upper pin extremity 34 to register with an aperture 35 in a protruding finger 36 (Figure 4) comprising part of the cradle arm 20. The cradle arm 19 is normally urged upwardly in a counterclockwise direction (viewed from Figure 17) by a compression spring 37 having the top end retained by a cup 38 impressed upwardly in the cradle arm 19 with the lower end of the spring 37 retained by a cupped disc 39 inverted over a screw 40 threaded in the supporting plate 15 to vary the compression in the spring 37 (Figure 17). As shown, the cradle arm 20 has depending side flanges 40' disposed normal thereto to present confronting pairs of aligned apertures 41—42 (Figure 17). The aligned apertures 41 in the confronting cradle plate flanges (40') cooperate with apertures in upstanding brackets 43 fixed to the plate 15 (Figure 17) to support a pintle 44 which pivotally supports the cradle arm 20 relative to the bed plate 15.

Figure 13:
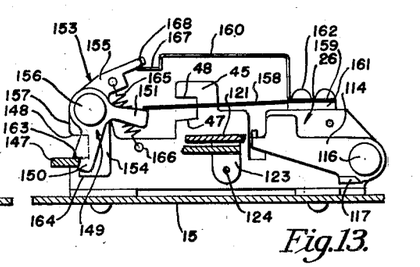
Figure 13 is a fragmentary sectional view in elevation of the switching toggles and bi-metallic trip therefor taken substantially along line XIII—XIII of Figure 11.

Consequently, the cradle arms 19—20 normally converge upwardly under the urge of the spring 37, and has a vertical maximum vibration responsive stroke at their fulcrum line defined by the fulcrum plate 33 within the limits of a suitable stop such as an angular hook trip 45 constituting a part of the bracket plate 26 (Figure 13). To this end, the cradle arm 20 has a projection 46 extending laterally therefrom (Figure 4) to extend under the angular hook trip 45 (Figure 13).

The angular hook 45 presents spaced shoulders 47—48 between which the cradle arm projection 46 of the cradle 19—20 extends to serve as a stop therefor, the vertical space between the shoulders 47—48 being commensurate with the predetermined maximum loading capacity of the filled vessel and the heating element supported thereon as will appear more fully hereinafter. The loading capacity of the cradle 19—20 is a factor of the strength of the spring 37 and the size and sensitivity of the vibration responsive mechanism. This can be varied within wide range depending upon the dictates of commercial practice, and a predetermined variation is rendered possible by adjusting the compression of the spring 37 by resort to the screw member 40 (Figure 17).

It should be noted that the cradle arm 20 has a downwardly offset lip 49 (Figures 4 and 17) which is disposed beneath the projecting portion 50 of the cradle arm 19 to limit the upward counterclockwise displacement of the cradle arm 20 relative to the clockwise displacement of the latter under the urge of the spring 37 (viewed from Figure 17), thereby precluding their separation. The cradle arms 19—20 have another plate 51 superposed thereon and operatively connected therewith for the attachment of the heating element thereto as will appear more fully hereinafter.

The platform T-plate 51 is substantially T-shaped (Figures 5, 10, 17 and 20) and has depending ears 52 spaced to bridge across the cradle arm 20 in the region of the depending sides 40 to provide aligned apertures 53 which register with the apertures 42 therein. A pintle 54 extends through the apertures 42 in the cradle arm sides 40' and the aligned apertures 53 in the ears 52 of the platform T-plate 51 that is pivotally mounted to present its leg 55 over the cradle arm 19 for loose operative association therewith.

The leg 55 of the platform T-plate 51 has a laterally offset depending hook 56 (Figures 5 and 17) attached to one edge thereof to project through a rectangular opening 57 (Figure 4) provided in the cradle arm 19 to be engageable with an edge thereof in precluding the accidental separation between the platform T-plate 51 and the cradle arm 19 when the cradle 21 and the platform T-plate 51 pivotally move relative to each other responsive to the vibration of the heating element thereon as will appear more fully hereinafter. The hook 56 limits the stroke of pivotal oscillation of the platform T-plate 51 relative to the cradle 21.

The T-plate 51 and its leg 55 will be movably supported with minimum friction relative to the cradle arm 19 proximate to the free extremity of the plate leg 55 by interposing a fulcrum plate 58 (Figure 16) which has an upper pin extremity 59 and a lower comparatively wider extension 60 loosely protruding respectively through a circular aperture 61 in the T-plate leg 55 and a slot 62 in the cradle arm 19. As a result, the respective plates 19—20—51 have relative minimum sliding movement with negligible friction by reason of their overlapping pivotal paths of oscillatory movements responsive to vibrations that are translated thereto as will appear more fully hereinafter.

The vibration responsive movement of the cradle 21 through its component pivotal arms 19—20 is transferred to a lever 63 having a counterweighted extension 64 on one side of its pivotal connection 65. The pivotal connection 65 of the lever 63 comprises a stud 65 that is enveloped by a spring 66 (Figure 4) to effect frictional retension on the cradle arm 19. The stud 65 is anchored in an extension 67 of the side flange 23 of the cradle arm 19, and the spring 66 urges washers 68—69 on the stud 65 to frictionally apply the lever extension 64 against the cradle arm flange extension 67. The lever extension 64 is frictionally associated and operatively connected for movement with and relative to the cradle arm 19 so that the lever 63 will automatically preset itself responsive to the weight of a heating element and loaded vessel on the cradle arms 19—20 and their superposed T-plate 51, as will appear more fully hereinafter.

Figures 4, 5, 6, 7, 8:
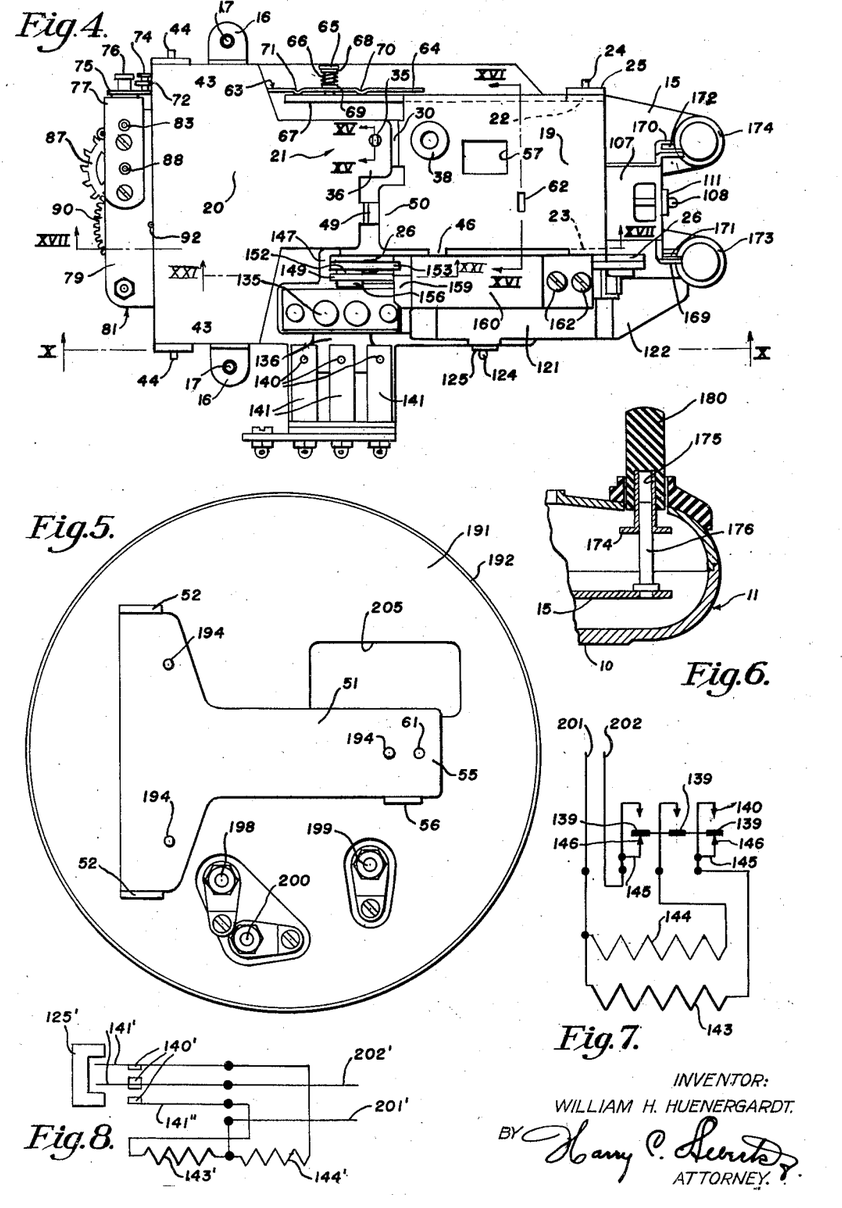
Figure 4 is a fragmentary plan view of the timing unit instrumentalities with the heating element and casing removed therefrom.
Figure 5 is a bottom plan view of the heating element supporting plate.
Figure 6 is a fragmentary sectional view in elevation of the device taken substantially along line VI—VI of Figure 2.
Figure 7 is a schematic A. C.-D. C. wiring diagram of the circuit embodied in the device shown in Figure 2.
Figure 8 is a modified A. C. schematic wiring diagram.

The lever 63 through its counterweighted extension 64 has, however, just enough friction with the cradle arm 19 to operate the timing mechanism connected therewith without slippage in the friction connector 65—66—68—69 (Figures 4 and 20). To insure uniform friction between the lever 63 and the cradle arm extension 67, circumferential ridges 70—71 (Figure 20) are impressed in the lever extension 64 to provide uniform contact with the flat surface of the cradle arm extension 67 under the urge of the spring 66. The counterweighting of the lever extension 64 renders the slippage more controllable, sensitive, and uniform for presetting purposes. The lever 63 extends to any suitable timing and control mechanism which, in this instance, is an escapement mechanism to be presently described.

Figure 11:
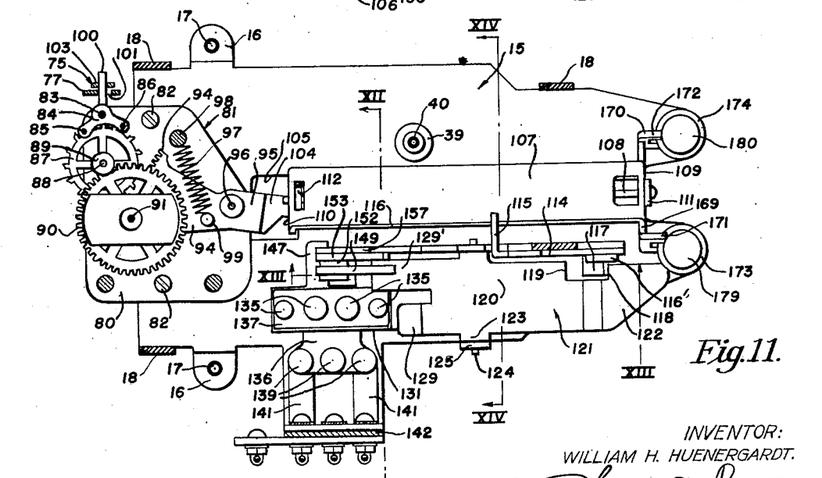
Figure 11 is a fragmentary sectional top plan view of the presetting and timing mechanism actuator plate shown in its initial position and taken substantially along line XI—XI of Figure 10.

To this end, the lever 63 terminates in a furcated yoke 72 presenting an open slot 73 (Figures 17 and 20) which receives a rivet head pin 74 carried by a small bell crank 75. The bell crank 75 is pivoted to a rivet head stud 76 fixed to a depending bracket 77 (Figure 4) which has an arm 78 attached to the upper horizontal frame plate 79 that confronts a lower horizontal frame plate 80 comprising the frame of a self-contained escapement mechanism 81 (Figure 11).

The self-contained escapement mechanism 81 is attached by its lower frame plate 80 to the supporting plate 15 by means of fasteners 82. A metal stub shaft 83 carries a double arm 84 provided with vertical pins 85—86 serving as pawls cooperating with an escapement or ratchet wheel 87 fixed to another stub shaft 88 journalled between the horizontal frame plates 79—80. The escapement wheel 87 has a pin wheel gear or pinion 89 fixed thereto for meshing engagement with a gear 90 frictionally carried by an elongated shaft 91 terminating in reduced extremities 92 (Figures 4 and 11). The shaft 91 is journalled on its extremities between the frame plates 79—80. The shaft 91 carries a pinion 93 which meshes with a gear sector 94 (Figure 11) having an extended trip lever 95 fixed thereto so that both sector 94 and trip lever 95 are mounted to a stub shaft 96 journalled between the frame plates 79—80.

The gear sector 94 and the trip lever 95 extend on opposite sides of the shaft 96, and are normally urged as a unitary element in a clockwise direction (viewed from Figure 11) by a spring 97. The spring 97 is anchored at one extremity to a stud 98 fixed between the frame plates 79—80 proximate to the supporting plate 15 so that the other spring extremity will engage a pin 99 fixed to the lever 95. Consequently, the lever 95 is normally urged in a clockwise direction to exert a constant rotary driving influence to the gear wheel 90, pinion 89, and escapement wheel 87. The escapement wheel 87 is controlled by the double pawl pins 85—86 normally serving as stops therefor. The double arm 84 which is fixed to the stub shaft 83 is operatively connected to the bell crank 75 by means of a lever 100 (Figure 11) which has one end thereof also fixed to the stub shaft 83. The lever 100 extends through a slot 101 in the depending bracket arm 77 to register with a slot 102 provided in the furcated arm 103 of the bell crank 75 (Figure 20). The width of the slot 101 in the bracket arm 77 can be adjusted to control the stroke and calibrate the timing operation of the escapement mechanism 81.

The pivotal movement of the double arm pawl 84 controlled by the vibration, jiggling, or up and down movement of the cradle 21 through the oscillatory responses of its arms 19—20 which, in turn, are actuated by the turbulence set up in coiling liquids and the like. These vibrating effects govern the permitted rotary movement of the gear wheel 90, pinion 89 and escapement wheel 87 that determines the extent of clockwise displacement of the trip lever 95 (viewed from Figure 11). The trip lever 95 is initially set to assume an extreme counter-clockwise position (viewed from Figure 11) which simultaneously sets, tensions or loads the escapement mechanism operating spring 97. Thus the timing mechanism is loaded each time the instrumentalities are preset to initiate any particular heat generation or other application for processing or control therewith.

The trip lever 95 has a downwardly offset hook extremity 104 (Figure 9) which projects through an opening 105 in the base plate 15 for positioning in the path of a trip 106 comprising a part of an elongated pivotal plate 107 (Figure 11). The plate 107 is longitudinally mounted on a pintle rod 108 that extends through depending plate ends 109—110 and adjacent upstanding brackets 111—112 struck up from the base plate 15. The pivotal plate 107 serves to actuate and control the switching instrumentalities to be hereinafter described. The escapement mechanism 81 actuates the pivotal plate 107 through the gear sector lever 95 which, in turn, actuates its hook 104 against the pivotal plate trip 106 responsive to the spring 97 subsequent to the full release occasioned by pulsations transmitted to the escapement wheel pawls 85—86, as will appear more fully hereinafter.

As stated, the release of the escapement hook 105 displaces the trip 106 of the pivotal shifter plate 107 in a counter-clockwise direction (viewed from Figure 3) to elevate a lever 114 (Figure 11) which has a laterally offset extremity 115 disposed above and in the path of the linear edge 116 of the pivotal shifter plate 107. The lever 114 is pivoted to the longitudinal bracket plate 26 by means of a stud 116' (Figure 13) to normally gravitate in a counter-clockwise direction.

As shown, the lever 114 has a bevelled edge trip 117 disposed laterally thereof proximate to its bottom edge below the pivot pin 116 to project oppositely of the lateral extremity 115. The lateral bevelled trip 117 is in the path of a shoulder 118 cut out as at 119 from the inward edge of a switch controlling plate 121. The switch controlling plate 121 has a downwardly depressed extension 122 whereon the shoulder 118 is positioned in the path of the lever bevelled trip 117 that has camming action with the confronting edge of the shoulder 118 to raise and lower the lever 114 responsive to the depression or elevation of the switch controlling plate 121.

The switch control plate 121 has depending brackets 123 struck from the edges thereof (Figures 11 and 13) to receive a pintle 124 therethrough that is supported by the bracket 26 and an upstanding ear 125 formed from the base plate 15 (Figure 11). A compression spring 126 is vertically disposed between the base plate 15 and the underside of the switch control plate 121 (Figure 10) for vertical alignment between confronting cylindrical detents 127—128 anchored to the base plate 15 and the underside of the switch controlling plate 121.

Consequently, the switch control plate 121 will be normally urged in a counter-clockwise direction (viewed from Figure 10) until its slightly depressed extremity 129 contacts the upper surface 130 of a switch terminal plate 131. The switch terminal plate 131 has its upwardly offset portion 130 provided with depending ears 132—133 (Figure 14) for pivotal mounting on the pintle 124 which also supports the switch control plate 121 superposed thereabove.

Figure 9:
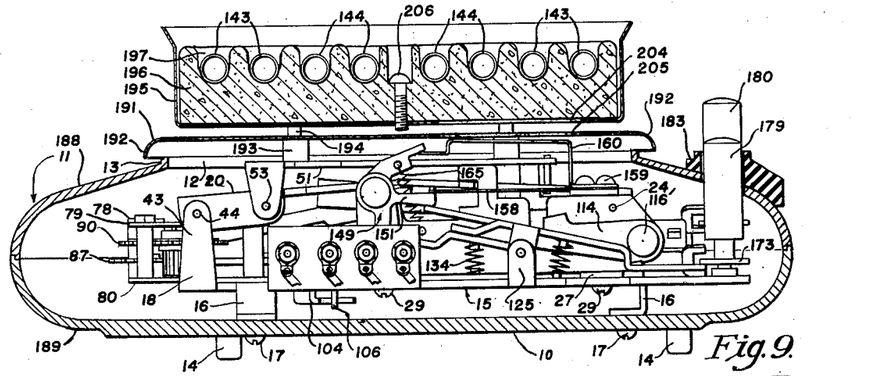
Figure 9 is a sectional view in elevation of the heating and timing mechanism taken substantially along line IX—IX of Figure 2.

The switch terminal plate 131 is normally urged in a clockwise direction (viewed from Figure 10) by a compression spring 134 that is comparatively weaker and lighter than the compression spring 126 which urges the switch control plate 121 in a direction opposite to the switch terminal plate 131 so that these parts are normally in contact by reason of the confronting depressed portion 129 on the switch control plate 121 and the corresponding upraised portion 130 on the switch terminal plate 131 unless the respective parts are maintained in spaced relation by lock levers such as the lever 114 which holds the switch control plate 121 in its extreme clockwise position (viewed from and as shown in Figure 9).

Figure 12:
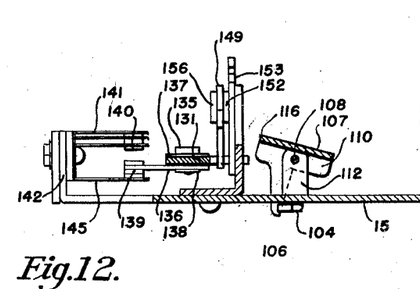
Figure 12 is a fragmentary sectional view of the switching and/or actuator instrumentalities taken substantially along line XII—XII of Figure 11.

The switch terminal plate 131 has a series of copper contacting buttons 135 provided therethrough to support an electric metallic contacting terminal 136 which is insulated from the switch terminal plate 131 by means of upper and lower mica sheets 137—138 (Figure 12). The terminal 136 carries, in this instance, three contacting buttons 139 which are adapted to confront corresponding contacts 140 carried by spring terminal supports 141 insulated from and supported by an upstanding and outwardly offset bracket 142 (Figure 12) comprising part of the base plate 15.

The terminals 140 and their supporting springs 141 are in series with heating and warming coils 143—144 (Figure 7) while the outside spring terminal supports 141 confront corresponding lower spring terminal supports 145, in this instance two, (Figure 7) so that contact of the outside switch terminals 139 with two lower terminals 146 will only place the warming coil 144 in circuit with the source of energy to maintain the processed substance, such as coffee, within a warming temperature range rather than subject such to a brewing temperature when subjected to both the heating and warming coils 143—144.

In short, when the switch terminal 136 carrying the terminal contacts 139, is in upraised position in contact with the spring supported terminal contacts 140, the heating and warming coils 143—144 are energized; with the switch terminal 136 in its lowermost position of displacement in contact with the lower terminals 146, the heating coil 143 is cutout and only the warming coil 144 is in circuit for energization; with the switch terminal 136 in its intermediate substantially horizontal position, the contacts 139 thereon are spaced from both the upper terminal contacts 140 and the lower terminal contacts 146 so that both coils 143 and 144 are deenergized.

In order to displace the switch terminal 136 so that its contacts 139 will rapidly snap into and out of contact with the upper terminal contacts 140 and the lower terminal contacts 146 so that these instrumentalities will be suitable for both alternating and direct circuits, the compression springs 126—134 are utilized to snap the switch terminal 136 upwardly and downwardly for retention in engagement with the upper terminal contacts 140 or the lower terminal contacts 146 by means of lock levers to be presently described.

As previously stated, the switch control plate 121 is retained in its extreme clockwise position to compress the spring 126 by means of the bevelled trip 117 on the lever 114. In this position, the lighter spring 134 will elevate the switch terminal 136 with its contacts 139 to engage the terminal contacts 140 and there held by means of the spring 134 with a lateral extension stop 147 (Figure 11 and 13) in engagement with a shoulder 148 provided on the vertical bracket plate 26 (Figure 13).

In this position, the pivotal shifting plate 107 is in its extreme clockwise position (viewed from Figure 3) and the escapement hook 104 is in its extreme counter-clockwise position (viewed from Figure 11) coincident with loading or tensioning the spring 97 of the escapement mechanism 81. In this position of the switch terminal 136, the heating coil 143 and the warming coil 144 are energized and in circuit with the electrical source of energy. As previously stated, the trip 117 on the lever 114 will retain the switch control plate 121 in its depressed extreme clockwise position (as shown in Figure 9).

Figures 1, 3:
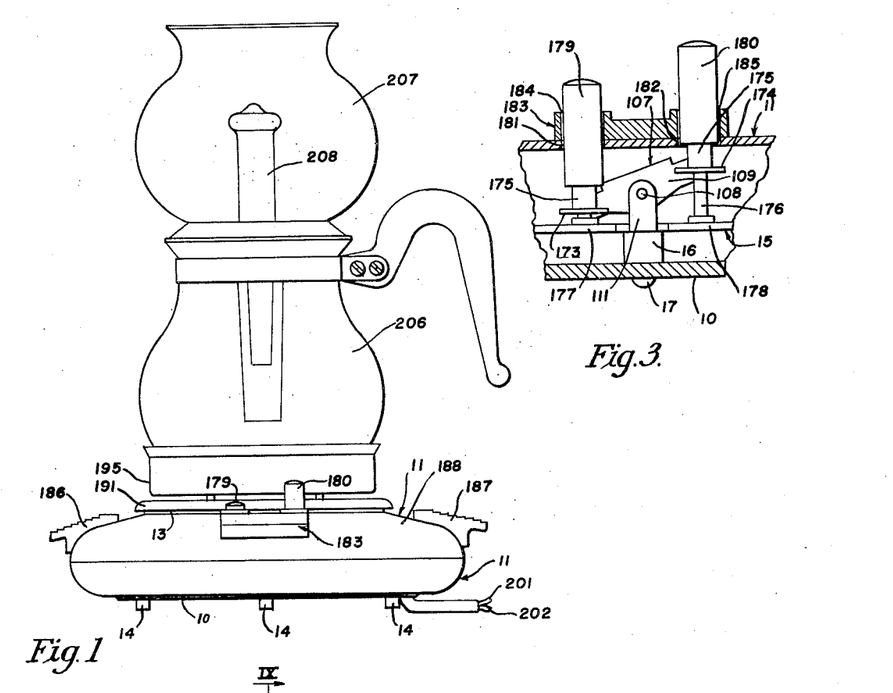
Figure 1 is a front view in elevation of a coffee infusion device in conjunction with heat controlling devices embodying features of the present invention.
Figure 3 is a fragmentary sectional view taken substantially along line III—III of Figure 2.

Now, then, when the cradle 21 and its component arms 19—20 receive the pulsations from the heating element to be hereinafter described, the escapement mechanism pawls 85—86 will be actuated to permit the escapement wheel 87 to rotate responsive to the urge of the spring 97 which actuates the gear sector 94 when the escapement 87 is permitted to turn under the control of the oscillating pawls 85—86. This continues until the gear sector lever 95 and its hook 104 arrives at its extreme clockwise position (viewed from Figure 11) to tilt the pivotal shifting plate 107 to its extreme counterclockwise position (viewed from and as shown in Figure 3) which, in turn, will displace the trip 115 of the lever 114 upwardly to remove the trip 117 from engagement with the switch control plate shoulder 118 and permit the switch control plate 121 to be displaced to its extreme clockwise position (viewed from Figure 10) under the urge of the heavier spring 126.

This displacement under the heavier spring 126 will cause the switch control plate depressed extension 129 to contact the upraised portion 130 of the terminal plate 131 to compress the comparatively lighter spring 134 and displace the terminal plate 131 with its terminal 136 and the latter's terminal contacts 139 downwardly in engagement with the lower terminal contacts 146, thereby cutting out the heating coil 143 and retaining in circuit only the warming coil 144.

The terminal 136 is held in this downward extreme position by means of a lever 149 having normally disposed arms 150—151. The lever 149 is spaced by means of a washer 152 from another lever 153 which has two obliquely disposed arms 154—155, the levers 149—153 with their spacing washer 152 are pivotally supported by a rivet head pin 156 anchored to an upstanding ear 157 of the vertical bracket plate 26. The upstanding ear 157 defines the shoulder 148 against which the terminal stop extension 147 abuts in its extreme upward position.

The lever 149 is normally urged in a clockwise direction (viewed from Figure 13) by a flat spring 158 which is anchored as at 159 to the vertical bracket plate 26, together with a bi-metal thermostat 160, both being attached to a horizontal ledge 161 struck from the vertical bracket plate 26 through which fasteners 162 extend for accomplishing the anchorage of both the flat spring 158 and the bi-metal thermostat 160.

The free extremity of the flat spring 158 engages the lever arm 151 to normally urge the lever 149 in a clockwise direction (viewed from Figure 13) so that an angular cut-out 163 in the corner of the lever arm 150 will engage the terminal extension 147 to retain the terminal 136 downwardly with its contacts 139 in engagement with the lower terminal contacts 146.

This extreme downward operative position of the switch terminal 136 is only possible when the lever 153 with its lower arm 154 has its lateral bottom offset 164 out of engagement with the switch terminal extension 147. This position of the lever 153 is opposite to the normally extreme clockwise position of the lever 153 under the influence of the coil spring 165 which engages the lever arm 155 at one extremity thereof while the other extremity of the spring 165 is anchored as at 166 to the vertical bracket plate 26, (Figure 13).

This displaced position of the lever 153 out of engagement with the switch terminal extension 147 is rendered possible only with the bi-metal thermostat 160 which is sufficiently cool at this time to straighten out to its normal horizontal position (as shown in Figure 13) with its downwardly offset free extremity 167 engaging the underside of the shoulder 168 provided on the extremity of the lever arm 155. Consequently, this will permit the warming coil 144 to be energized, whereas under conditions wherein the heating element is maintained hot by the processed substance or fluid, such as coffee, the bi-metal thermostat 160 will be deflected downwardly in a counter-clockwise direction (viewed from Figure 13) so that the coil spring 165 will urge the lever 153 to assume its extreme clockwise position with its bottom offset 164 engaging the underside of the switch terminal extension 147 to preclude contact between the confronting terminal contacts 139 on the switch terminal 136 and the lower terminal contacts 146 on the terminal supporting springs 145. It should be noted that the switch control plate 121 has a straight extension 129' thereon in the path of the lever arm 151 for disposition therebelow to shift the lever 149 in a counter-clockwise direction (viewed from Figure 9) to positively release the lever arm cut-out 163 from the path of the switch lever extension 147, to permit the ascent of the switch terminal 136 responsive to the clockwise depression of the switch control plate 121.

When the unit is sufficiently cooled to call for the energization of the warming coil 144 after the switch terminal 136 has been shifted from its uppermost position by the timing mechanism lever 95, the bi-metal thermostat 160 will bring its free extremity 167 upwardly to engage the lever arm shoulder 168 to displace the lever arm 154 with its bottom offset 164 from the path of the switch terminal extension 147 so that the switch terminal 136 with its terminal contacts 139 can be shifted further downwardly under the urge of the stronger spring 126.

This continued energization of the warming coil 144 will take place until the attendant cuts out the energy source from the main line by removing the plug from the wall socket or by actuating the main line switch on the cord (not shown) depending upon the dictates of commercial practice.

In order to actuate the pivotal shifter plate 107 to initiate the operation of the heating coil 143 and the warming coil 144 and/or merely place the warming coil 144 in circuit, the shifter plate 107 has its forward depending flange 109 provided with lateral extensions 169—170 (Figure 11) which has forwardly offset furcations 171—172 to receive horizontal discs 173—174 therein for operative connection therebetween.

Each of the discs 173—174 have upstanding sleeves 175 fixed thereto (Figure 6) for vertical reciprocal guidance on posts 176 anchored in forward extensions of the base plate 15 (Figure 4). The disc 173 operatively connects with the furcation 171 of the shifter plate extension 169 (Figure 11) and also is disposed over and in the path of the switch control plate extension 122 to effect the depression thereof coincident with depressing the disc 174 through the medium of the insulator buttons 179—180 that have frictional connection with the sleeves 175. Consequently, the shifter plate 107 and the switch control plate 121 will be simultaneously actuated responsive to depressing the button 179, which preferably should be red in color to distinguish it from the warming coil button 180, which preferably should be black or some other distinguishing color. The depression of the red button 179 shifts the plate 107 to its extreme counter-clockwise position (viewed from Figure 3) to displace the escapement lever 95 with its hook 104 to its extreme counter-clockwise position (viewed from Figure 11), thereby loading or tensioning the escapement spring 97 and establishing contact between the switch terminal 136 with its terminal contacts 139 in engagement with the upper terminal contacts 140 to energize the heating coil 143 and the warming coil 144 until there are vibrations, pulsations or jiggling transferred to the cradle 21 and its component arms 19—20 to permit the escapement wheel 87 to rotate under the urge of the loaded tension spring 97 until the lever hook 104 thereof reaches its extreme clock-wise position (viewed from Figure 11) to shift the plate 107 to its extreme clockwise position (viewed from Figure 3) and open the circuit to both the heating coil 143 and the warming coil 144.

If and when the bi-metal thermostat 160 is sufficiently cool to straighten out and elevate the lever arm 155 (Figure 13) against the opposite urge of the spring 165, the switch terminal extension 147 will be disengaged by the lever arm offset 164 and permit the switch terminal 136 with its contacts 139 to be lowered by the stronger of the two springs 126 until contact is established with the lower terminals 145, thereby only reenergizing the warming coil 144.

The operation of the bi-metal thermostat 160 is important in that variations as to the timing of the reenergization of the warming coil 144 take place determined upon whether the attendant starts with cold water or hot water in the act of making coffee or processing other substances for that matter. Should the substance be completed and thereafter cooled by the attendant who may desire to effect the reheating thereof after a lapse of time, all that is necessary is to depress the button 180 to energize the warming coil 144.

The buttons 179—180 project through apertures 181—182 (Figure 3) provided in the casing 11 and a suitable guide plate 183 is disposed therethrough for attachment to the casing 11 to provide vertical apertures 184—185 in aligned registry with the casing apertures 181—182. Suitable handles 186—187 of plastic or other material are attached to the upper portion 188 which is complemental to the lower portion 189 comprising sections of the casing 11.

Figure 2:
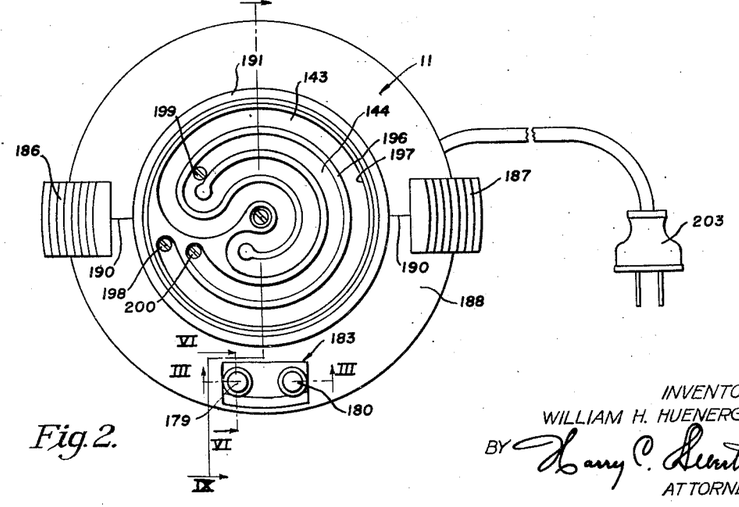
Figure 2 is a plan view of the heat control device shown in Figure 1 with the coffee maker removed therefrom.

The upper section 188 may, should practice so dictate, be diametrically split along line 190 to present half sections (Figure 2) to enable access to or inspection of the instrumentalities confined within the casing 11. These instrumentalities have been described in detail and are mounted on the base plate 15 which is attachable to the bottom 10 of the casing 11 by means of the base plate bracket 16 having connection with the threaded fastener 17 from the exterior.

The bottom 10 of the casing 11 is preferably apertured to provide sufficient circulation of air therethrough to maintain the instrumentalities at room or unheated temperature. The T-plate 51 connects with a heating element shield 191 that has a convexly curved peripheral rim 192 overlapping the orifice flange 13 of the casing 11 (Figure 9) for spaced support therefrom by means of posts 193. Suitable studs 194 (Figure 5), in this instance 4, extend through the T-plate 51 and the posts 193, the shield 191 and the metal receptacle 195 (Figure 9) which receives the heat resistant heating element block 196.

The heat resistant block 196 is provided with concentric circular grooves 197 therein to receive the heating coils 143—144 therein (Figure 2) so that their extremities can be anchored to threaded terminal posts 198—199 and 199—200 respectively, for the connection of lead wires 201—202 thereto. The lead wires 201—202 terminate in a conventional wall plug 203 (Figure 2) utilization in connecting the device to a source of energy such as the lighting circuit.

So that the bi-metal thermostat 160 will be more rapidly responsive to the condition of the heating coils 143—144 and the surrounding heating element 196 and its receptacle 195, the bottom of the receptacle 195 is provided with an enlarged opening 204 (Figure 9) in registry with a corresponding opening 205 provided in the plate 191 immediately above and in alignment with the bi-metal thermostat 160.

The aligned openings 204—204 are slightly larger than the upper surface area of the bi-metal thermostat 160 for full exposure thereof to the heat generated in and absorbed by the heating element 196, the coils 143—144, the heating element receptacle 195, and the associated parts. It should be noted that the heating element holder 196 is held in the receptacle 195 by means of an axially projecting threaded fastener 206 to establish connection therebetween.

In the modified alternating current switch construction (Figures 8 and 18 and 19), there is no requirement for quick make or break of the circuits necessary in direct current or combination of alternating and direct current circuits. Consequently, the switching construction can be simplified to eliminate all of the quick acting functioning instrumentalities and merely utilizing a switch control plate 121' in conjunction with the disc 173' having a sleeve 175' fixed thereto for reciprocal guidance on the post 176' (Figure 19).

The red button 179' is fixed over the sleeve 175' to enable depression of the switch control plate 121' which is pivotally mounted as at 124' to a block 125'. The block 125' has a cut-out 125'' to receive the spring extensions 141', in this instance two, that carry the terminal contacts 140'. However, the lowermost of the three terminal contacts 140' is carried by a terminal spring 141'' which are anchored in an insulated terminal block 131'. Consequently, the terminal switch 136 can be elevated against the spring terminal supports 141'—141'' to establish contact between all three terminals 140' and thus energize the heating coil 143' (Figure 8) while the descent of the switch terminal 136 will provide for normal engagement between the two lowermost terminal contacts 140' which maintains the warming coil 144' energized. In all other respects, the instrumentalities are identical for exclusive use in connection with an alternating current circuit.

The lead wires 201—202 (Figures 2 and 7) connect to a plug 203 for attachment to any lighting circuit. These wires 201—202 connect to a terminal base bracket 142 (Figures 4, 9 and 11) from which the suitable connections can be made to the switch terminals 141—145, and then to the heating elements 143—144. The function of the instrumentalities will now be described in connection with a coffee-maker of the infusion type for illustrative purposes only, and should not be construed as a limitation of the uses to which the teachings of the present invention can be put. The coffee pot 206 is filled with water to make the desired cups of coffee, and the funnel 207 with its central coffee stop or filter 208 is supported thereon in the customary manner. Coffee of sufficient quantity is placed in the funnel 207 around the stop 208 which permits the flow of water and vapor upwardly therearound, but retains the coffee thereabove. The heating or processing is now ready to be initiated.

The weight of the coffee maker 206—207 together with its contents will vary greatly and will compress the cradle spring 37 commensurate with its total weight. This will cause the heating element holder 196 and cradle arms 19—20 to descend to a position commensurate with this varying weight depending upon the size and measured contents of the coffee maker 206—207. The initial setting of the starting mechanism is not, however, influenced by the varying position of these instrumentalities because the lever 63 is automatically preset relative thereto. The timing mechanism is operable by the lever 63 that is self-adjusted through its frictional connection 65 with the cradle arm 19. The loaded heating element holder 196 resting on the cradle arms 19—20 presets the connection of the lever 63 therewith independent of the timing and switch setting instrumentalities.

Consequently, the attendant before or after the placement of the substance on the heating element holder 196 can set the mechanism by depressing the button 179. This causes the shifter plate 107 to rotate its trip 106 (Figure 14) against the gear sector hook 105 of the escapement mechanism 81 to load or tension the spring 97. Simultaneously, the switch control plate 121 is depressed to close the circuits to both heating elements 143—144. Nothing will happen and the mechanism will remain in this position until enough heat is generated by the heating elements 143—144 and transferred to the coffee maker 206—207 to cause the water in the vessel 206 to be elevated in the funnel 207 owing to the vapor pressure in the pot 206.

The vapor pressure and/or boiling of the water creates turbulence in the vessels 206—207 thereby effecting a vibration or jiggling movement that causes the cradle 21 and its component arms 19—20 to move up and down and slightly shift the fulcrum plates 33—58 that support the pivotal cradle arms 19—20. Consequently, the vibration translating lever 63 will oscillate the escapement pawl pins 85—86 to permit the escapement spring 97 to intermittently operate the escapement wheel 87 and its operatively connected elements 88—89—90—91 and gear sector 94, the latter simultaneously swinging the hook 104 and trip lever 106 until engagement and consequent clockwise displacement of the shifter plate 107 (viewed from Figure 3) is effected.

It should be noted that the friction in the connector pin 65 and spring 66 establishing the necessary friction between the lever extension 64 and cradle arm 19 is sufficient to transmit the vibration of the cradle 21 but is insufficient to sustain the initial loaded displacement of the cradle arm 19, thereby automatically presetting the lever 63.

This clockwise displacement of the shifter plate 107 releases the switch control plate 121, thereby shutting off the electric current controlled by the switch terminal 141, and any further heat generation through both heating coils 143—144. The coffee is now fully prepared in accordance with the infusion method which is well known and understood and requires no further explanation. The coffee is now ready for serving and the electric current has been completely shut off unless the bi-metal thermostat 160 is sufficiently cooled by this time or after a short interval to permit the switch terminal 138 with its terminal contacts 139 to engage the lower terminal contacts 146, thereby energizing only the warming coil 144 to keep the coffee at a warm temperature for delayed serving. The warming can continue until the attendant pulls the plug 200 as fully described supra.

While one form of control and operating characteristics have been illustrated, the teachings of the present invention could be applied to percolator and other methods of coffee preparation and to the processing of innumerable other substances which would set up movement responsive to any predetermined treatment that is within the dictates of commercial practice.

While I have illustrated and described a preferred embodiment of this invention, it must be understood that the invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. In a device of the character described, the combination with electrical switch means, timing means for operating said switch means, means for initially setting said switch means and timing means, means responsive to a predetermined physical impulse processing condition for releasing said timing means from its initially set position, and means responsive to the predetermined operation of said released timing means for displacing said switch means from its initially set position.

2. In a device of the character described, the combination with electrical switch means, timing means for operating said switch means, means for initially setting said switch means and timing means, means responsive to a predetermined physical impulse processing condition for releasing said timing means from its initially set position, and spring actuated means responsive to the predetermined operation of said released timing means for displacing said switch means from its initially set position.

3. In a device of the character described, the combination with electrical switch means, timing means for operating said switch means, means for initially setting said switch means and timing means, means responsive to a predetermined physical impulse processing condition for releasing said timing means from its initially set position, spring actuated means responsive to the predetermined operation of said released timing means for displacing said switch means from its initially set position, and means responsive to said initial setting means for retaining said switch displacing means in initially set position until released by said timing means.

4. In a device of the character described, the combination with electrical switch means, timing means for operating said switch means, means for initially setting said switch means and timing means, means responsive to a predetermined physical impulse processing condition for releasing said timing means from its initially set position, spring actuated means responsive to the predetermined operation of said released timing means for displacing said switch means from its initially set position, and lever trip means responsive to said initial setting means for retaining said switch displacing means in initially set position until released by said timing means.

5. In a device of the character described, the combination with pivotal spring mounted electrical switch means, timing means for operating said switch means, means for initially setting said switch means and timing means, means responive to a predetermined physical impulse processing condition for releasing said timing means from its initially set position, and spring actuated means responsive to the predetermined operation of said released timing means for displacing said pivotal spring mounted switch means from its initially set position.

6. In a device of the character described, the combination with electrical switch means, timing means for operating said switch means, means for initially setting said switch means and timing means, means responsive to a predetermined physical impulse processing condition for releasing said timing means from its initially set position, means responsive to the predetermined operation of said released timing means for displacing said switch means from its initially set position and thermal responsive means for retaining said switch means in a predetermined position against complete displacement until a predetermined temperature range is reached whereupon said switch means are released for further displacement.

7. In a device of the character described, the combination with electrical switch means, timing means for operating said switch means, means including interconnected physical impulse push buttons for initially setting said switch means and timing means, means responsive to a predetermined processing condition for releasing said timing means from its initially set position, and means responsive to the predetermined operation of said released timing means for displacing said switch means from its initially set position.

8. In a device of the character described, the combination with pivotal spring mounted electrical switch means, timing means for operating said switch means, means including interconnected physical impulse push buttons for initially setting said switch means and timing means, means responsive to a predetermined processing condition for releasing said timing means from its initially set position, and spring actuated means responsive to the predetermined operation of said released timing means for displacing said pivotal spring mounted switch means from its initially set position.

9. In a device of the character described, the combination with electrical switch means, timing means for operating said switch means, means for initially setting said switch means and timing means, means responsive to a predetermined physical impulse processing condition for releasing said timing means from its initially set position, spring actuated means responsive to the predetermined operation of said released timing means for displacing said switch means from its initially set position, means responsive to said initial setting means for retaining said switch displacing means in initially set position until released by said timing means, and thermal responsive means for retaining said switch means in a predetermined position against complete displacement until a predetermined temperature range is reached whereupon said switch means are released for further displacement.

10. In a device of the character described, the combination with pivotal spring mounted electrical switch means, timing means for operating said switch means, means for initially setting said switch means and timing means, means responsive to a predetermined physical impulse processing condition for releasing said timing means from its initially set position, spring actuated means responsive to the predetermined operation of said released timing means for displacing said pivotal spring mounted switch means from its initially set position, and thermal responsive means for retaining said switch means in a predetermined position against complete displacement until a predetermined temperature range is reached whereupon said switch means are released for further displacement.

11. In a device of the character described, the combination with pivotal spring mounted electrical switch means, timing means for operating said switch means, means including interconnected physical impulse push buttons for initially setting said switch means and timing means, means responsive to a predetermined processing condition for releasing said timing means from its initially set position, spring actuated means responsive to the predetermined operation of said released timing means for displacing said pivotal spring mounted switch means from its initially set position, and thermal responsive means for retaining said switch means in a predetermined position against complete displacement until a predetermined temperature range is reached whereupon said switch means are released for further displacement.

12. In a device of the character described, the combination with electrical switch means, timing means for operating said switch means, means including reciprocable physical impulse push buttons and a pivotal interconnecting shifter plate for initially setting said switch means and timing means, means responsive to a predetermined processing condition for releasing said timing means from its initially set position, and means responsive to the predetermined operation of said released timing means for displacing said switch means from its initially set position.

13. In a device of the character described, the combination with electrical switch means including reciprocable physical impulse push buttons and a pivotal interconnecting shifter plate for initially setting said switch means and timing means, means responsive to a predetermined processing condition for releasing said timing means from its initially set position, spring actuated means responsive to the predetermined operation of said released timing means for displacing said switch means from its initially set position, and lever trip means responsive to said initial setting means for retaining said switch displacing means in initially set position until released by said timing means.

14. In a device of the character described, the combination with pivotal spring mounted electrical switch means including reciprocable physical impulse push buttons and a pivotal interconnecting shifter plate for initially setting said switch means and timing means, means responsive to a predetermined processing condition for releasing said timing means from its initially set position, spring actuated means responsive to the predetermined operation of said released timing means for displacing said switch means from its initially set position, and lever trip means responsive to said initial setting means for retaining said pivotal spring mounted switch displacing means in initially set position until released by said timing means.

15. In a device of the character described, the combination with pivotal spring mounted electrical switch means including reciprocable physical impulse push buttons and a pivotal interconnecting shifter plate for initially setting said switch means and timing means, means responsive to a predetermined processing condition for releasing said timing means from its initially set position, spring actuated means responsive to the predetermined operation of said released timing means for displacing said switch means from its initially set position, lever trip means responsive to said initial setting means for retaining said pivotal spring mounted switch displacing means in initially set position until released by said timing means, and thermal responsive means for retaining said switch means in a predetermined position against complete displacement until a predetermined temperature range is reached whereupon said switch means are released for further displacement.

16. In the processing of substances with the application of heat, the combination with a heat generator, of means for yieldingly sustaining said heat generator, said heat generator being placed in motion by the turbulence caused in the substance supported thereon for application of heat thereto, movement responsive timing means operatively connected to said heat generator for controlling the operation thereof, and snap spring action electric switch means preset by and operable responsive to said timing means to reduce the rate of heat produced by said generator.

17. In the processing of substances with the application of heat, the combination with a heat generator, of a cradle comprising pivotal overlapping arms movable relative to each other for yieldingly sustaining said heat generator, fulcrum plates between overlapping portions of said pivotal arms, said cradle being placed in motion by the turbulence caused in the substance supported by said heat generator for the application of heat thereto, movement responsive timing means operatively connected to said cradle, and heat generator control means responsive to said timing means to reduce the rate of heat produced by said generator.

18. In the processing of substances with the application of heat, the combination with a heat generator, of a movable cradle comprising pivotal overlapping arms for yieldingly sustaining said heat generator, there being confronting openings in said overlapping arms, fulcrum plates interposed between said confronting openings to support said overlapping pivotal arms with minimum friction therebetween, said cradle being placed in motion by the turbulence caused in the substance supported by said heat generator for the application of heat thereto, movement responsive timing means, movement translating means operatively connected between said cradle and timing means, a spring for supporting said cradle arms in an initial position, and heat generator control means responsive to said timing means to render said heat generator inoperative.

19. In the processing of substances with the application of heat, the combination with a heat generator, of a movable cradle for yieldingly sustaining said heat generator, said cradle being placed in motion by the turbulence caused in the substance supported by said heat generator for the application of heat thereto, movement responsive timing means, counterweighted movement translating means operatively connected between said cradle and said timing means, an adjustable frictional connection between said counterweighted movement translating means and said cradle to render said timing means operative irrespective of the initial position of said heat generator with the substance supported thereon, and spring actuated snap-action heat generator switch control means responsive to said timing means to vary the effect of said heat generator to a predetermined extent responsive to the operation of said timing means.

20. In the processing of substances with the application of heat, the combination with a heat generator, of a movable cradle for yieldingly sustaining said heat generator, a floating connection between said heat generator and cradle, said cradle being placed in motion by the turbulence caused in the substance supported by said heat generator for the application of heat thereto, movement responsive timing means operatively connected to said cradle, heat generator control switching means responsive to said timing means to vary the effect of said heat generator to a predetermined extent responsive to the operation of said timing means, push button manual setting and operating means for said switching means, and a pivotal shifter plate interconnecting said push buttons, timing means, and switch means.

21. In the processing of substances with the application of heat, the combination with a heat generator, of means for yieldingly sustaining said heat generator, said heat generator being placed in motion by the turbulence caused in the substance supported thereon for application of heat thereto, heat generator movement responsive timing means operatively connected to said heat generator for controlling the operation thereof, electric switch means preset by and operable responsive to said timing means to reduce the rate of heat produced by said generator, and thermostatic means for precluding the operation of said last named switch means unless said heat generator has reached a predetermined sustained heat transmission capacity.

WILLIAM H. HUENERGARDT.

REFERENCES CITED

The following references are of record in the file of this patent:

UNITED STATES PATENTS

| Number | Name | Date |
|---|---|---|
| 1,437,005 | Newsom | Nov. 28, 1922 |
| 2,385,694 | Davis | Sept. 25, 1945 |
| 2,402,163 | Huenergardt | June 18, 1946 |